United States Patent
Mikkelsen

(10) Patent No.: US 6,958,555 B2
(45) Date of Patent: Oct. 25, 2005

(54) METHOD FOR PRODUCING AN ENCASED ROTOR OF A PERMANENT MAGNET

(75) Inventor: Nils Mikkelsen, Tjele (DK)

(73) Assignee: Grundfos A/S, Bjerringbro (DK)

( * ) Notice: Subject to any disclaimer, the term of this patent is extended or adjusted under 35 U.S.C. 154(b) by 0 days.

(21) Appl. No.: 10/468,929

(22) PCT Filed: Feb. 27, 2002

(86) PCT No.: PCT/EP02/02087

§ 371 (c)(1),
(2), (4) Date: Feb. 9, 2004

(87) PCT Pub. No.: WO02/069478

PCT Pub. Date: Sep. 6, 2002

(65) Prior Publication Data

US 2004/0111869 A1    Jun. 17, 2004

(30) Foreign Application Priority Data

Feb. 27, 2001 (EP) .................................. 01104790

(51) Int. Cl.$^7$ ........................ H02K 15/03; B29C 31/00
(52) U.S. Cl. ........................... 310/42; 310/87; 29/598
(58) Field of Search ........................... 310/42, 44, 87; 29/598, 607–609, 732; 264/267, 269, 272.2; 417/423.3

(56) References Cited

U.S. PATENT DOCUMENTS

| 4,104,787 A | * | 8/1978 | Jandeska et al. ............ 29/596 |
| 4,126,933 A | * | 11/1978 | Anderson et al. ............ 29/598 |
| 4,713,877 A | | 12/1987 | Abbott et al. |
| 4,818,305 A | | 4/1989 | Steingroever |
| 4,845,837 A | * | 7/1989 | Lloyd ........................ 29/598 |
| 4,918,802 A | * | 4/1990 | Schaefer .................... 29/598 |
| 5,288,447 A | * | 2/1994 | Day ........................ 264/112 |
| 5,495,658 A | | 3/1996 | Teshigawara et al. |
| 5,627,423 A | * | 5/1997 | Marioni ................ 310/156.23 |
| 5,687,471 A | * | 11/1997 | Noguchi et al. ............ 29/598 |
| 5,881,447 A | * | 3/1999 | Molnar ..................... 29/598 |
| 6,331,214 B1 | * | 12/2001 | Koga et al. ................ 148/101 |
| 6,836,954 B1 | * | 1/2005 | Carli et al. ................ 29/596 |

* cited by examiner

Primary Examiner—Burton Mullins
(74) Attorney, Agent, or Firm—Jacox, Meckstroth & Jenkins

(57) ABSTRACT

The method serves for manufacturing a canned rotor of a permanent magnet motor. Firstly a shaft (2) provided with a rotor core [rotor laminated sheet package] (3) together with a pre-blank (11) forming the later magnet and a [sheet] metal casing (6) surrounding the pre-blank is applied with play into a pressing tool (12). The pre-blank (11) is then deformed by way of end-face pressure impingement such that it then bears with a non-positive fit and over the whole surface on the rotor core [rotor laminated sheet package] (3) and on the [sheet] metal casing (6), wherein the casing (6) is widened radially until its bearing on the pressing tool (12) by way of the radially widening pre-blank (11). After this the magnetisation and hardening is effected, whereupon the free spaces remaining between the [sheet] metal casing (6) and lid (2) are closed by two annular lids, which are tightly connected to the [sheet] metal casing (6) and the shaft (2) with a material fit.

17 Claims, 2 Drawing Sheets

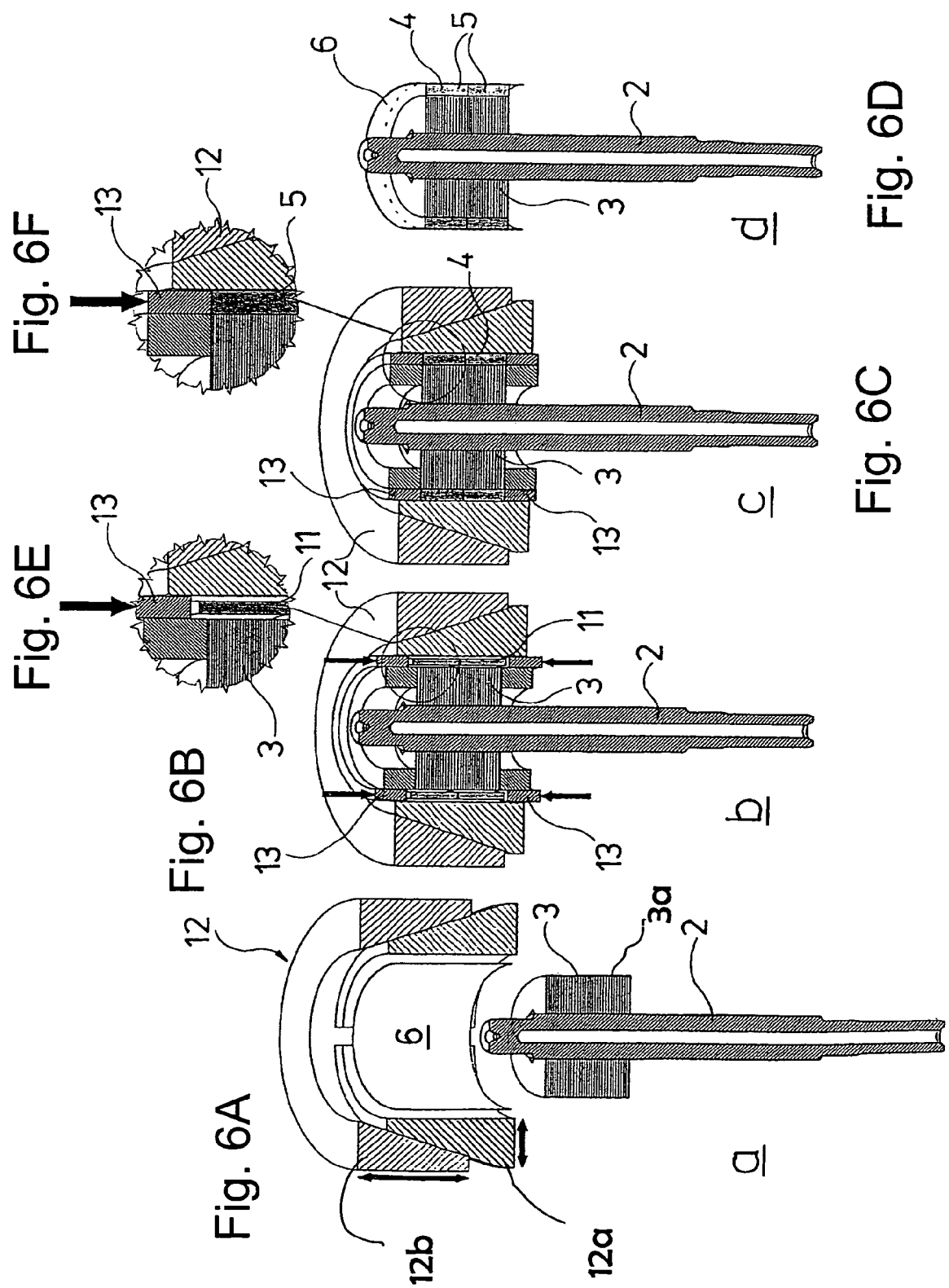

METHOD FOR PRODUCING AN ENCASED ROTOR OF A PERMANENT MAGNET

Figure 1:
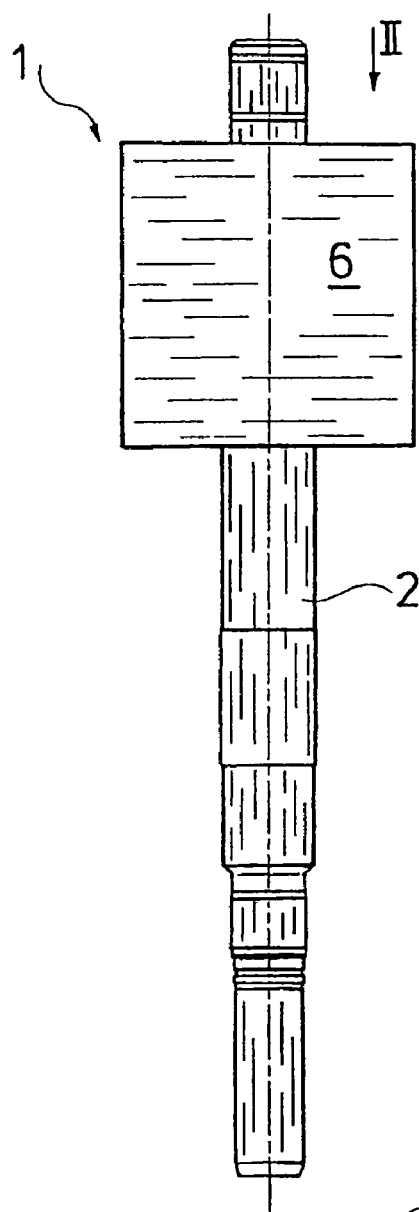

The invention relates to a method for manufacturing a canned rotor of a permanent magnet motor.

With rotors of permanent magnet motors, permanent magnets are either to be arranged directly on the motor shaft or on a rotor iron part seated on the rotor shaft, for example a rotor core [laminated sheet package]. With this it may be the case of individual magnets to be distributed uniformly over the periphery of one or more annular magnets which are suitably polarised. Since the torques occurring on the motor shaft are produced via the magnetic flux between the stator and the rotor and thus also via the permanent magnets located therein, the magnets are to be fastened in a suitably stable manner. For this there are mechanical solutions such as for example are known from the U.S. Pat. Nos. 4,855,630 and 5,140,210 or 5,627,423. Such mechanical fastenings are not only expensive in manufacture but they furthermore tend to be unbalanced which must be compensated as the case may be.

Such mechanical fastenings are furthermore often not practical if the rotor needs to be completely canned, as is usually the case with wet-running motors. In particular with the magnets used today which are based on neodynium at all events one must prevent these from coming into contact with water. Here plastic encasings are usually not sufficient since as a rule they are not diffusion-proof.

From the U.S. Pat. No. 5,495,658 there is known a method with which the magnet is formed and sintered in the later rotor casing and only after this is the shaft inserted. The dimensional accuracy in particular on the rotor casing is supposed to be particularly favorable due to this. The manufacturing method described in this document is however not so suitable for the large-scale manufacture of canned rotors. On the one hand the fastening of the shaft represents a problem and on the other hand high tension stresses are introduced into the magnet on account of the pressing-in, which should be avoided after its hardening. Furthermore, this manufacturing method is not suitable for rotors provided with a rotor core comprising a rotors laminated sheet package, since the connection between the rotor core (rotor laminated sheet package) and the magnet may not be controlled or is only very difficult to control, and in any case the rotor core (rotor laminated sheet package) on the peripheral side needs to be machined with material removal.

Against this background it is the object of the invention to provide a method for manufacturing a canned rotor of a permanent magnet motor with which such rotors may be inexpensively manufactured in large scale manufacture, in particular industrial scale manufacture, in particular whilst avoiding the previously mentioned disadvantages.

SUMMARY OF THE INVENTION

According to the invention this object is achieved by providing a method for manufacturing a canned rotor of a permanent magnet motor, in particular a wet-running motor, with the following method steps to be carried out after one another: a shaft, where appropriate provided with a rotor iron part together with a pre-blank surrounding this and forming a later magnet and with a (sheet) metal casing surrounding the pre-blank is applied into a pressing tool; the pre-blank is deformed by end-face pressure impingement such that it bears with a non-positive fit on the inside on the shaft or the rotor iron part which is present as the case may be, and on the outside on the (sheet) metal casing, wherein the casing is widened radially by the radially widening pre-blank, until its bearing on the pressing tool; the (sheet) metal casing before or after the magnetisation and hardening of the blank is closed at the end face by two annular lids which are tightly connected to the (sheet) metal casing and the shaft or to the rotor iron part.

Advantageous embodiments and further formations of the method as well as the construction of such a rotor are defined in the dependent claims, the subsequent description and the drawings.

In one embodiment, the method according to the invention is formed as follows:

First, a shaft or as the case may be a shaft already provided with a rotor iron part with a pre-blank which as the case may be is of several parts and which forms the later magnet, and with a cylindrical sheet metal section which forms the later sheet metal casing is applied into a pressing tool. The components at the same time have an adequate play to one another so that they may be joined into one another practically without any force effort. The pre-blank in one or more pressing procedures is then deformed by end-face impingement with pressure to an extent such that it bears with a non-positive fit on the inside on the shaft (if the magnet is directly seated on the shaft) or on the rotor iron part and on the outside on the metal casing.

At the same time the dimensioning of the pre-blank and metal casing is configured such that the casing during the pressing procedure may radially widen up to its bearing on the pressing tool. After this deformation procedure the metal casing is closed at both end faces by a lid. The lids on the inner side are sealingly connected to the shaft or to the rotor iron part and on the outer side to the metal casing. The magnetisation and hardening of the blank is effected after the pressing procedure.

Rotor iron part in the context of the present invention is to be understood as any component between the shaft and the magnet conducting the magnetic flux. Such a component may typically be formed by a rotor core (rotor laminated sheet package) or also a ferrite sintered body.

The method according to the invention not only creates an intimate non-positive union between the blank or the magnet, the (sheet) metal casing and the rotor iron part or shaft, but furthermore in practically one working procedure ensures a high radial dimensional accuracy of the rotor. A further considerable advantage of the method according to the invention in particular lies in the fact that with a rotor equipped with a rotor core (rotor laminated sheet package), the rotor core (rotor laminated sheet package) on the outer periphery does not need to be machined separately since the pre-blank bears flushly onto the outer side of the rotor core (rotor laminated sheet package) by way of the pressing procedure. A further considerable advantage of the method according to the invention lies in the fact that one does not need to use any adhesive for fastening the magnet, which loses its strength properties in particular at high operating temperatures. Furthermore with regard to manufacturing technology it is advantageous that in spite of using a sintered pre-blank one may do away with the critical handling with powder. The pre-blank constructed as a sintered body may be manufactured separately without interfering with the remaining manufacturing and assembly process.

The pre-blank may be of several parts, for example, in the form of ring segments or rings or ring segments bearing on one another in an axial manner. The pre-blank preferably consists of two rings bearing axially on one another which are impinged by pressure from both axial sides simultaneously or also after one another. On account of the introduction of pressing force on both sides and due to the fact that one applies two rings bearing axially on one another one may very easily control the flow procedure of the material. One ensures a uniform material flow over the whole axial length of the pre-blank.

In order to completely encapsulate the rotor, i.e. in a fluid-tight manner, it is useful to form the lids by sheet metal shape parts which at their inner side are connected to the shaft and at their outer side to the metal casing. According to the design of the rotor iron part it may be sufficient on the shaft side to weld the (sheet) metal casing to the rotor iron part instead of to the shaft in order to achieve a sealed encapsulation. For welding the (sheet) metal casing to the lids it is useful on the one hand to design the lid cup-shaped and on the other hand to let the (sheet) metal casing of the motor to project beyond the blank, seen in the axial direction, that is, the later magnets. Then specifically the lid edge may be welded to the (sheet) metal casing in a region which is distanced so far from the blank or magnet that a noticeable heat effect, in particular a heat effect compromising the magnet is avoided. The welding procedure may thus also be effected after the magnetisation. Furthermore it is possible in this manner to carry out the welding of the casing and lid from the outside of the casing, in that one welds through the casing for example by way of a laser.

Usefully the pressing tool, casing and pre-blank are dimensioned such that the casing with the pressing procedure is plastically deformed beyond its elasticity limit. By way of this deformation of the casing a calibration of the rotor may be simultaneously effected so that for this one requires no separate working procedure.

The magnetisation and hardening of the blank may in principle be effected at any time after the reshaping (deformation) procedure. If a hardening is effected by an external heat effect, the magnetisation and subsequent hardening is advantageously effected before the connection of the (sheet) metal casing to the lids, since due to the heat effect with the hardening procedure, residual moisture or gases which may be present are removed.

According to the construction type and the material used, as the case may be one may however do away with a hardening by way of an external heat effect. The hardening is then effected during operation of the motor, for example during a trial run specially conditioned for this, but also during normal operation. As the case may be one may also completely do away with a hardening of the magnet since this is mechanically rigidly tensioned between the (sheet) metal casing and the shaft or sheet metal casing and rotor iron part, and otherwise is not subjected to any mechanical loading.

These and other objects and advantages of the invention will be apparent from the following description, the accompanying drawings, and the appended claims.

Figure 3:
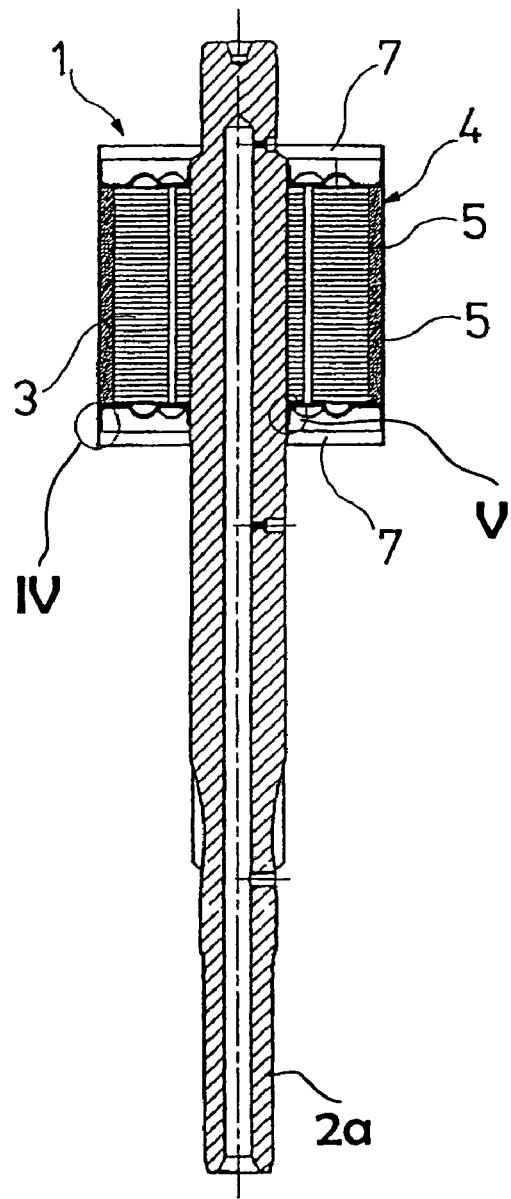
Figure 2:
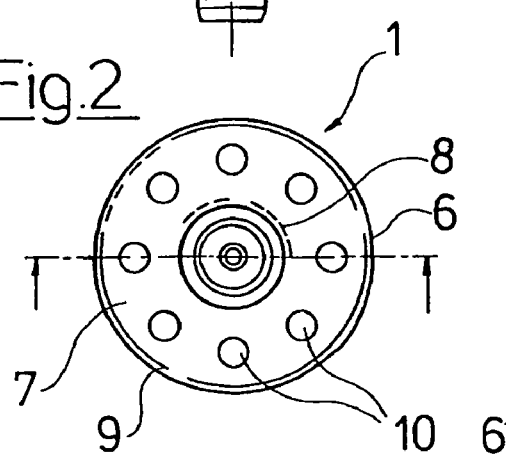
Figure 4:
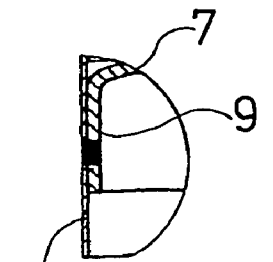
Figure 5:
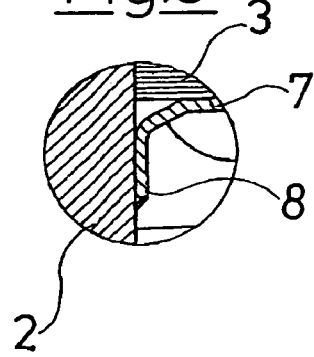

The invention is hereinafter described in more detail by way of one embodiment example shown in the drawing. There are shown in FIG. 1, lateral view of a rotor manufactured according to the invention;

FIG. 2, an end view in the direction of the arrow II in FIG. 1;

FIG. 3, a longitudinal section through the rotor according to FIG. 1;

FIG. 4 shows the detail IV in FIG. 3 in an enlarged representation;

FIG. 5, the detail V in FIG. 3 in an enlarged representation; and

FIGS. 6A–6F illustrate the manufacturing process in four part steps by way of schematic longitudinal section representations.

DETAILED DESCRIPTION OF PREFERRED EMBODIMENT

The rotor 1 shown individually by way of FIGS. 1 to 6F consists of a shaft 2 on which the rotor core rotor laminated sheet package 3 is fastened. The rotor core 3 comprises a rotor laminated sheet package on a peripheral side 3a (FIG. 6A) is surrounded by a blank 4 which consists of two rings 5 which abut one another at the end face and are flush with one another and which forms the magnet of the rotor. The rotor core 3 is not machined on the peripheral side and the blank 4 connects to this unmachined outer periphery of the rotor core 3 over the whole surface in a flush manner and is connected to this with a non-positive fit.

The blank 4 on its outer periphery is surrounded by an essentially cylindrical metal casing 6 which bears over the whole outer circumference of the blank 4 on this and is connected to this with a non-positive fit.

The region between the shaft 2 and the metal casing 6 (FIG. 6A is closed off by two lids 7 which in each case immersed into the space formed between the metal casing 6 and the shaft 2 and are formed by sheet metal shape parts. The lids 7 comprise an edge 8 (FIG. 5) and edge 9 (FIG. 4) extending inwards and outwards respectively via which they are welded to the part of the metal casing 6 or the shaft 2 extending beyond the blank 4. The detail IV which is enlarged in FIG. 4, clearly shows the outer edge 9 which bears within the metal casing 6 and is welded to this over the circumference. The metal casing 6 projects axially over the edge 9.

The detail V (FIG. 3), which is enlarged in FIG. 5, shows the welding of the inner edge 8 to the shaft 2, and specifically via a fillet weld lying at the end face on the inner edge 8 between the shaft 2 and the lid 7. The lids 7 furthermore comprise eight dome-shaped impressions 10 (FIG. 2) which serve for stabilizing and for preventing oscillations.

The previously described rotor 1 is hermetically sealed with respect to the rotor core 3 and the blank 4 which forms the magnet, by way of the metal casing 6 and the lid 7 as well as the shaft 2 and is envisaged for application in the can of a wet-running motor. At the same time, the shaft 2 at both sides of the rotor core 3 on the other side of the lids 7 carries axial bearings. The long, free shaft end 2a (FIG. 3) for example carries an impeller of a circulation pump.

The manufacture of the previously described rotor is effected as shown by way of FIGS. 6A–6F and described hereinafter.

In a first step, the shaft 2 with the rotor core 3 fastened thereon, the cylindrical metal casing 6 and a pre-blank 11 is applied into a pressing tool 12. The pre-blank 11 consists of two equally large rings 12a and 12b (FIG. 6A) bearing flush on one another, of a presintered magnetisable material based on neodynium. The presintering is effected such that one achieves a retention of the pre-blank 11, that is, of the two rings and a sufficient shape stability, but that despite this a further deformability may be achieved, that is, a hardening is not yet effected. The components are matched to one another such that they lie in one another with play, wherein the pre-blank 11 in its axial length projects beyond the rotor core 3 at both sides.

Within the pressing tool, which is constructed of several parts and here is not shown in detail, the components are fixed in the position shown in FIG. 6B. With this, the metal casing 6 lies with play within the pressing tool 12. In a step shown in FIG. 6C, there is then effected the actual pressing procedure, and specifically simultaneously from above and below. The punches mustering the pressing force are indicated at 13. The pressing force direction is deduced from the arrows shown in FIG. 6B. The punches 13 are traversed so far that the pre-blank 11 at the end face occludes flushly with the rotor core 3 and thus forms the blank 4, as is described and shown by way of FIG. 6C. The dimensioning of the volumes of the pre-blank 11, the free space formed between the rotor core 3 and the metal casing 6 as well as the diameter of the metal casing 6 are selected such that if the pre-blank 11 has been reshaped into the blank 4 pressed in FIG. 6c, this not only bears over the whole surface and with a non-positive fit on the outer periphery of the rotor core 3 and on the inner periphery of the metal casing 6, but that furthermore the metal casing has been radially plastically deformed up to its bearing on the pressing tool due to the reshaping pressure, and thus has been calibrated.

After removing the pressing tool 12 which for this purpose is designed of several parts, not only is there formed a rigid connection between the shaft 2, rotor core 3, blank 4 and metal casing 6, but the metal casing is furthermore already calibrated, that is, is brought to its exact radial dimension. In this shape (illustrated in FIG. 6D), the rotor is already completely stable, and it may be magnetised and also hardened, whereupon then subsequently the lid 7 is added and is welded externally by way of lasers. The magnetisation and hardening may be effected before as well as after the complete encapsulation.

With the previously described embodiment example, the blank 4 formed from the pre-blank 11 consists of two rings, by which means one is to achieve a more uniform material flow with the pressing procedure. To support this, two punches 13 from above and below are provided for mustering the pressure forces. It is to be understood that the blank or the pre-blank may also be basically formed as one piece or may consist of several segments.

The following table lists various part numbers and corresponding parts:

1—rotor
2—shaft
3—rotor core
4—blank
5—rings
6—metal casing
7—lids
8—inner edge
9—outer edge
10—embossing
11—pre-blank
12—pressing tool
13—punch While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for manufacturing a canned rotor of a permanent magnet motor, in particular a wet-running motor, comprising the steps of:

providing a shaft with or without a rotor iron part;
providing a pre-blank that may later form a magnet surrounding said shaft or, if said shaft supports a rotor iron part, surrounding also said rotor iron part;
said pre-blank having a first end face, a second end face an inside and an outside;
situating said shaft, said rotor iron part if said shaft supports said rotor iron part, said pre-blank and said metal casing into a pressing tool;
deforming said pre-blank by applying pressure to said first and second end faces of said pre-blank such that it bears with a non-positive fit on said shaft or said rotor iron part and said outside bears again said inside metal casing, wherein the casing is widened radially by the radially widening pre-blank, until it engages said pressing tool; and
closing the metal casing by situating an annular lid to each of said first and second casing ends, before or after the magnetization and hardening of said pre-blank so that said metal casing is closed by said annular lids, which are tightly connected to the metal casing and the shaft or to the rotor iron part.

2. The method according to claim 1, characterized in that the pre-blank is constructed of several parts and is applied in the form of ring segments that bear axially on one another.

3. The method according to claim 1, characterized in that said annular lids are formed by sheet metal and are connected to the shaft and to the metal casing by welding.

4. The method according claim 1, characterized in that the metal casing projects beyond said pre-blank in the axial direction of the rotor and is connected to the edges of each of said annular lids by welding, wherein the welding is preferably effected from the outside of the metal casing through this.

5. The method according to claim 3, characterized in that the casing is deformed beyond its elasticity limit during said deforming step.

6. The method according to claim 1, characterized in that the pressure impingement is effected from said first and second ends of said pre-blank simultaneously.

7. The method according to claim 1, characterized in that the magnetization and hardening of said pre-blank is effected before the connection of the metal casing to said annular lids.

8. The method according to claim 1, characterized in that the hardening of the pre-blank is effected in the motor during the operation of said rotor.

9. A pre-blank for a magnet of a canned rotor of a permanent magnet motor, characterized in that an axial length of said pre-blank is larger than an axial length of an associated rotor iron part against which is pressed said pre-blank, such that when said pre-blank is compressed along its axial length, said pre-blank moves inwardly against said rotor iron part and outwardly against said metal casing; wherein said pre-blank forms the magnet after magnetization.

10. The pre-blank according to claim 9, characterized in that said pre-blank comprises a first end face and a second end face; said pre-blank being formed against said first end face with a first ring and against said second end face with a second ring, bearing on one another at said first and second end faces.

11. A canned rotor of a permanent magnet motor, wet-running motor, comprising:
a shaft having a rotor iron part together with a pre-blank deformed around said shaft or said rotor iron part, said pre-blank providing a magnet; and a metal casing surrounding said pre-blank;

said pre-blank having an inside that bears with a non-positive fit on at least one of said shaft or said rotor iron part when a pressure is applied to said pre-blank, and an outside that bears on the metal casing, wherein said metal casing comprises a radially widened area;

said metal casing having a first casing end face and a second casing end face and also having, before or after magnetization and hardening of the pre-blank a first lid situated on said first casing end face and a second lid situated on said second casing end face;

said first and second lids being connected to the metal casing and at least one of the shaft or the rotor iron part.

12. The canned rotor according to claim 11, wherein said pre-blank comprises a plurality of ring segments situated on said shaft axially adjacent one another.

13. The canned rotor according to claim 11, wherein said first and second annular lids comprise sheet metal and are connected to said shaft and to said metal casing by welding.

14. The canned rotor according to claim 11, wherein said metal casing projects beyond said pre-blank in an axial direction of the rotor and is connected to said first and second annular lids by welding, wherein the welding is preferably effected from the outside of the metal casing.

15. The canned rotor according to claim 11 wherein the metal casing is deformed beyond its elasticity limit when said pressure is applied to said pre-blank.

16. The canned rotor according to claim 11, wherein said pre-blank comprises a first end face and a second end face opposite said first end face, said pressure being applied to said pre-blank from said first and second end faces simultaneously to provide said canned rotor.

17. The canned rotor according to claim 11, wherein said pre-blank is magnetized and hardened before said first lid and said second lid are situated on said first casing end face and said second casing end face, respectively, of said metal casing.

* * * * *

UNITED STATES PATENT AND TRADEMARK OFFICE
CERTIFICATE OF CORRECTION

| | | |
|---|---|---|
| PATENT NO. | : 6,958,555 B2 | Page 1 of 1 |
| APPLICATION NO. | : 10/468929 | |
| DATED | : October 25, 2005 | |
| INVENTOR(S) | : Nils Mikkelsen | |

It is certified that error appears in the above-identified patent and that said Letters Patent is hereby corrected as shown below:

On the Title Page Item (54) - after the word "MAGNET", please insert -- MOTOR --

Claim 1, Column 6, Line 13, please delete the word "again" and insert -- against --

Signed and Sealed this

Twenty-fifth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,958,555 B2 | Page 1 of 1 |
| APPLICATION NO. | : 10/468929 | |
| DATED | : October 25, 2005 | |
| INVENTOR(S) | : Nils Mikkelsen | |

It is certified that error appears in the above-identified patent and that said Letters Patent is hereby corrected as shown below:

On the Title Page Item (54) and Column 1, line 2 - after the word "MAGNET", please insert -- MOTOR --

Claim 1, Column 6, Line 13, please delete the word "again" and insert -- against --

This certificate supersedes the Certificate of Correction issued March 25, 2008.

Signed and Sealed this

Twenty Second Day of April, 2008

JON W. DUDAS
*Director of the United States Patent and Trademark Office*